March 6, 1962     H. H. SCHMITT     3,023,501
ARTIFICIAL TEETH, FACINGS AND METHOD OF MAKING AND INSTALLING
Filed Jan. 14, 1957
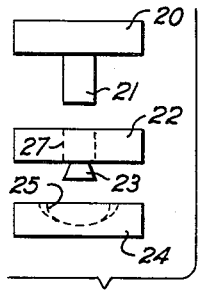
FIG. 1
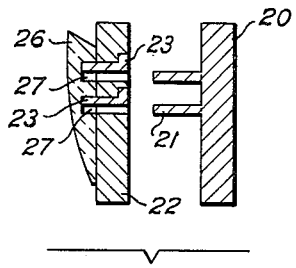
FIG. 3
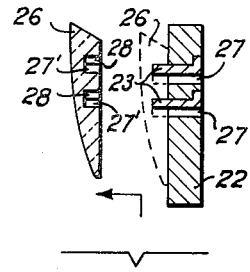
FIG. 4
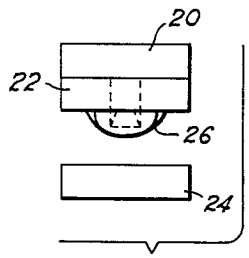
FIG. 2
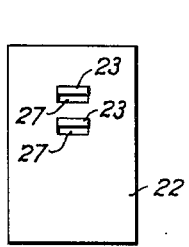
FIG. 5
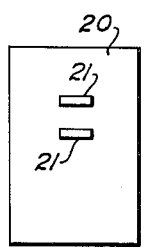
FIG. 6
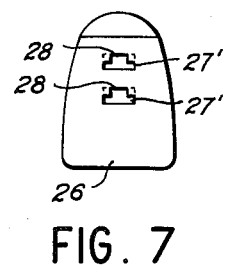
FIG. 7
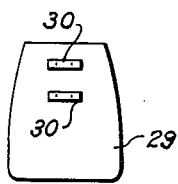
FIG. 8
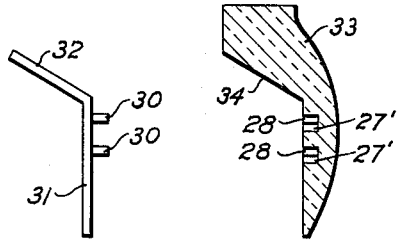
FIG. 9    FIG. 10
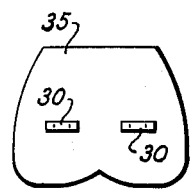
FIG. 11
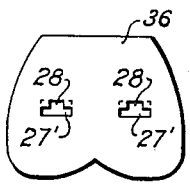
FIG. 12
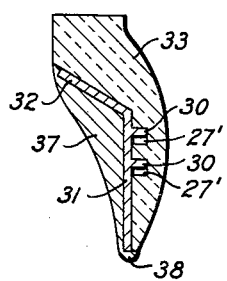
FIG. 13
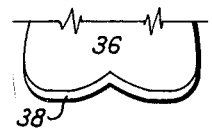
FIG. 14
FIG. 15
HERBERT H. SCHMITT
INVENTOR.
BY *Loyal H. McCarthy*
ATTORNEY.

3,023,501
ARTIFICIAL TEETH, FACINGS AND METHOD
OF MAKING AND INSTALLING
Herbert H. Schmitt, 2442 NE. 48th Ave., Portland, Oreg.
Filed Jan. 14, 1957, Ser. No. 634,052
17 Claims. (Cl. 32—10)

My invention relates to a means and method for facing artificial teeth such as are used in dentures or bridges in the dental arts. There have been various designs, methods and devices employed in the dental profession over a period of several decades for facing artificial teeth. However, one or more disadvantages, weaknesses or limitations have been found in the devices, designs and methods heretofore generally used in this field, including frequent failures in the facings due to the design, material or method of attachment thereof, expensive procedures in replacing damaged facings, surface irregularities or slots and crevices in which food particles, etc., could lodge and ferment, or the lack of acceptable aesthetic properties. My invention, therefore, relates to the correlation of sound and desirable mechanical, chemical, technological and aesthetic factors in facings and artificial teeth.

One of the objects of my invention, consequently, is to provide a facing of porcelain or other suitable material for an artificial tooth which is durable.

Another object of my invention is to provide a method and means for facing artificial teeth which is comparatively simple and inexpensive in the event replacement becomes necessary.

A further object of my invention is to provide a method and means for facing artificial teeth which will provide a metal protecting incisal or occlusal edge.

A still further object of my invention is to provide a facing that is not limited to any type, shape or size of artificial tooth or teeth which may be replaced without disturbing this protecting incisal or occlusal metal edge with comparatively inexpensive procedures, especially in removable bridges.

Still another object of my invention is to provide a method and means for facing artificial teeth which will combine acceptable aesthetic, mechanical and biological characteristics.

Still another and further object of my invention is to provide a facing for artificial teeth which will have no exposed slots, crevices or surface irregularities for the lodgment of food particles or promotion of unsanitary conditions, etc.

Referring to the drawings:

FIG. 1 is a top view of the three components of one form of a mold such as would be employed to cast facings, the components being shown separated from each other.

FIG. 2 is a top view of one form of the three components of a mold such as would be used in casting a facing, showing the matrix component, which forms the shape of the facing, removed from the other two components.

FIG. 3 is a side elevation in section taken through the center line of one form of a mold, the matrix component not being shown, with the cast facing in place on the central component and with the base component withdrawn therefrom.

FIG. 4 is a side elevational view in section through the center of the central mold component, showing the facing removed therefrom.

FIG. 5 is a front elevational view of the central component of one form of a typical mold.

FIG. 6 is a front elevational view of the base component of one form of a typical mold.

FIG. 7 is an elevational view from the back side of a facing which has been cast in one form of a matrix mold component showing the attachment recesses formed therein by the tongues of the central and base mold components.

FIG. 8 is a front elevational view of one form of a backing plate with the lugs thereon which engage with the attachment recesses formed in the back of a cast facing.

FIG. 9 is a side elevation view of another form of a backing plate showing the locking lugs thereon.

FIG. 10 is a side elevational view in section through the center of a facing which has been cast in another form, particularly designed for use with a backing plate as shown in FIG. 9.

FIG. 11 is a front elevation view of another form of a backing plate, showing a variation in the positioning of the locking lugs thereon.

FIG. 12 is an elevational view from the back side of a cast facing for use with a backing plate as shown in FIG. 11, showing the attachment recesses for receiving the locking lugs formed therein.

FIG. 13 is a side elevational view in section of one form of an artificial tooth assembled from one form of a backing plate and facing.

FIG. 14 is a fragmentary front elevational view of a cast facing showing the occlusal marginal surface tip.

FIG. 15 is a fragmentary, sectional elevational view of a replacement facing in position on an artificial tooth before being slipped into seated position with the existing incisal or occlusal marginal tip.

Referring further to the drawings:

One form of a mold which may be used to cast the facings of my invention may consist of three components, as shown in FIGS. 1 to 6 inclusive. The base component 20 of such a mold is provided with two fixed tongues 21 which are parallel with each other and which may be aligned vertically or horizontally, depending on the size and shape of the facing. The tongues 21 are of uniform width and depth for their entire length of projection beyond the base component 20. A central mold component 22 is provided with two dovetailed tongues 23 which are parallel with each other and which may be aligned either vertically or horizontally with respect to each other. The dovetailed tongues 23 have their widest point at their outer ends and become narrower at the juncture point with the central mold component 22. The widest point of the dovetailed tongues 23 is the same width as that of the tongues 21. Immediately below each of the dovetailed tongues 23 on the central component 22 is a slot 27 which is adapted to receive each complementary fixed tongue 21 of the base mold component 20. When these two components are positioned for use, the tongues 21 and 23 will project the same distance beyond the central mold component 22. The matrix mold component 24 which forms the facing is provided with a recessed portion 25, shown by dotted lines in FIG. 1, which may have the shape of any one of the varieties of facings to be cast, such as facings 26, 33, 36, etc. A raw porcelain mixture, or other suitable material, is inserted in the recessed portion 25 of the matrix mold component 24, and all three components 20, 22 and 24 are then positioned in proper alignment and relation with each other and secured during a heat curing process. After the heat treatment the mold components are separated from each other. The base mold component 20 first must be withdrawn from its seated position on the central mold component 22, see FIGS. 3 and 4, so that the cast facing 26, etc., may be removed from the central mold component. In order to remove the cast facing 26, etc., from the central mold component it must first be shifted upwardly with respect thereto, so that the dovetailed tongues 23 of the mold component 22 will be positioned in the slots 27' formed in the cast facing 26, etc., by the ends of tongues 21 and then moved directly away from component 22, as indicated by the arrow in FIG. 4. The dovetailed tongues 23 will then readily slide out through the slots 27'. The matrix mold component 24 may be removed from the facing either before or after removing the facing from the central mold component.

The parallel tongues 21 and 23, being positioned with tongues 21 immediately under the parallel dovetailed tongues 23 during the casting process of a facing 26, 33, 36, etc., form attachment recesses 27' and 28 in the back of the casting. The recesses 27' are of uniform width and depth while the recesses 28 positioned immediately above the recesses 27' are the same width at the interior portion thereof as the recesses 27' but are substantially narrower at the back surface of the casting. This arrangement forms shoulders in the recesses 28 which are adapted to receive and retain dovetailed lugs 30 positioned in proper parallel alignment on a backing plate 29, 31 or 35, and thus to secure a complementary casting 26, 33 or 36 firmly in proper position. As shown in FIGS. 8 and 9, dovetailed lugs 30 are arranged parallel and vertically with respect to each other and are adapted to be used in connection with a facing such as 33, as shown in FIG. 10, as well as a facing 26.

The backing plate 31 is provided with an extension 32 which is angularly positioned at the top margin thereof. This design of a backing plate is particularly adapted to use with the facing 33 which is provided with an angular surface 34 on the back thereof complementary to the extension 32 of the backing plate 31. This arrangement further enables an artificial tooth to be constructed or faced so as to have a minimum amount of metal showing in the mouth or contacting tissue at the gum line.

The backing plate 35, shown in FIG. 11, is provided with dovetailed lugs 30 which are parallel and horizontally arranged with respect to each other. This backing plate is designed particularly for use in constructing an artificial tooth of the molar classification. Molars and the other teeth of the dental arch which are primarily involved in chewing have a greater width than the incisal teeth and, consequently, more desirable stability is obtained in constructing such a tooth from a backing plate 35 and facing 36, FIGS. 11 and 12. The side by side arrangement of the dovetailed lugs and the corresponding seating recesses 28 in the facing more securely anchor the facings against tiltable displacement and breakage as a result of chewing or mastication.

Regardless of whether an artificial tooth or bridge calls for molar or incisor type teeth, the general method of building up the tooth or refacing a damaged tooth constructed in accordance with my invention is the same. The appropriate backing plate and a compatible facing are selected. The back side of the facing with its recesses is cemented; and it is then positioned on the backing plate by inserting the dovetailed lugs 30 into the recesses 27' of the facing and then slipping the facing downwardly, so that the dovetailed lugs 30 seat into the matching recesses 28. The configuration of the tooth on the back side thereof is then completed, filled in and shaped in harmony with the particular requirements and contours of the tooth, its adjacent teeth and the dental arch by the use of any one of the acceptable or suitable dental metals, such as gold or platinum, as indicated at 37 in FIGS. 13 and 15. The metal filling 37 is extended beyond the backing plate and over the incisal or occlusal marginal edge of the facing 26, 33, 36, etc., as the case may be, to form a protecting metal tip 38. The tip 38 is shaped in accordance with the requirements of the particular dental arch and the shape of the particular type of tooth and facing involved. The tip provides a protection across the edge of the facings of porcelain, or other suitable material, against breakage or other damage during mastication or biting processes.

In the event a facing of an artificial tooth constructed in accordance with my invention becomes damaged or broken, so that it is necessary to remove the same to make proper repairs, this can be done with much greater facility and economy than has been possible with existing methods and types of facings or artificial tooth construction. The damaged facings can be removed by suitable means well known to the dental profession without the necessity of disassembling the bridge or plate in which it is incorporated. A new facing may then be selected, matched and cemented to position by following the same steps set forth hereinabove for originally installing the facing on a new tooth or teeth being constructed for a bridge or denture. As shown in FIG. 15, a replacement facing 33 has been placed toward the gum surface preparatory to being slipped into seated position with an existing protecting marginal metal tip 38. Since there is a certain amount of resiliency to the gum tissue in the mouth, it is apparent that my facing and method of constructing artificial teeth or bridge components has the marked advantage of enabling repairs or replacements of damaged facings of teeth in bridges without the necessity of removing the bridge from a mouth in which it may be permanently anchored. My invention and method of making and repairing artificial teeth or bridge components is also more advantageous both from a time and economy standpoint when used in dentures or removable bridges than are existing facings and methods and installing the same. However, the greatest advantages are realized when confronted with repairs or replacements to a tooth component in a fixed bridge. Under present methods, incorporating the means presently available, it is generally as expensive, or more so, to remove and repair a damaged tooth in a fixed bridge than it would be to make a complete new bridge. By employing my invention it is possible to construct a substantial and aesthetic appearing dental appliance which will reveal a minimal amount of metal, to provide great structural strength and service qualities and to effect more economical repairs with savings of time to both dentist and patient.

By reversing the matrix mold component 24 with respect to the central mold component 22 and the base component 20 the facing 26, 33, 36, etc., as the case may be, will be formed so that the slots 27' and 28 will be in reverse position with respect to the incisal or occlusal edge of the particular facing. A facing so formed will be applied from the incisal or occlusal edge which is exactly opposite to the direction of applying the facings as hereinabove described and in conformance with current practices. There will still be circumstances in which it will be found desirable and more practical to place the facing of my invention into seated position from the incisal or occlusal edge toward the gum surface. In either event, whether the facing is designed to be seated in position from the incisal or occlusal edge or from the gum line surface toward the biting edge, a facing in accordance with my invention and method of installing the same will leave no exposed slots, crevices, cracks or other irregularities in which particles of food and the like could become lodged. This advantage minimizes the possibilities of fermentation of lodged particles and resultant disagreeable breath, unsavory taste or unsanitary status.

Other types of facings for artificial teeth now in use are largely restricted to a particular type of tooth or area. However, the design and type of my invention is not limited to any particular type of tooth or restricted to the teeth in any given area of the entire dental arch.

It is also understood that I am not limiting myself to disclosures as set forth herein, that such disclosures are merely preferred embodiments of my invention and that variations thereof are feasible without departing from its spirit or scope.

Having thus described my invention, I claim:

1. In a method of making artificial teeth: using a base mold component having two parallel tongues of uniform width and length projecting therefrom in spaced relation slideably engaged in complementary parallel slots positioned in a central mold component, said central mold component having two parallel dovetailed tongues positioned immediately above said parallel slots and said parallel tongues of the base component when the central component and base component are slideably engaged; pressing facing material in a matrix mold component containing a recess therein for receiving said facing material; pressing said matrix component and facing material therein upon the central mold component and the projecting tongues of said central mold component and said base mold component; heat curing the material in the assembled mold components; withdrawing the base component and tongues from the central mold component and the matrix component and facing therein; removing the matrix component from the central component and the cured facing; shifting the facing upwardly until the dovetailed tongues of the central mold component rest in the slots formed by the tongues of the base mold component and removing the central mold component from the facing by withdrawing the dovetailed tongues of the said component through the slots in the facing formed by the tongues of the base component, thereby forming a facing with two pairs of parallel slots in the back surface thereof, one slot of each pair being dovetailed and the other slot of each pair being of uniform width; shaping a backing plate to correspond with the shape of the facing, said backing plate having two dovetailed lugs in parallel spaced relation with each other, adapted to slide into the uniform width slots of the facing and to slip into seated engagement with the dovetailed slots in said facing; placing cement in the slots in the back surfaces of the facing and on the back surface thereof; then placing the facing in position to engage the lugs of the backing plate; positioning and slipping said backing plate into seated engagement with the dovetailed slots in said facing; and forming metal on the reverse side of the backing plate to provide a compatible configuration of the tooth with the adjacent dental arch and to provide a protecting metal tip to the backing plate at the biting edge of said facing beyond the front of said backing plate.

2. In a method of making facings for artificial teeth: using a base mold component having two parallel tongues of uniform width and length projecting therefrom in spaced relation slideably engaged in complementary parallel slots positioned in a central mold component, said central mold component having two parallel dovetailed tongues positioned immediately above said parallel slots and said parallel tongues of the base component when the central component and base component are slideably engaged; pressing facing material in a matrix mold component containing a recess therein for receiving said facing material; pressing said matrix component and facing material therein upon the central mold component and the projecting tongues of said central mold component and said base mold component; heat curing the material in the assembled mold components; withdrawing the base component and tongues from the central mold component and the matrix component and facing therein; removing the matrix component from the central component and the heat-cured facing; and shifting the facing in a paralleling direction to the backing until the dovetailed tongues of the central mold component rest in the slots formed by the tongues of the base mold component and removing the central mold component from the facing by withdrawing the dovetailed tongues of the said component through the slots in the facing formed by the tongues of the base component, thereby forming a facing with two pairs of parallel slots in the back surface thereof, one slot of each pair being dovetailed and the other slot of each pair being of uniform width.

3. In an artificial tooth: a backing plate provided with parallel dovetailed lugs in spaced relation thereon, said lugs formed to relatively wide horizontal and thin vertical dimensions; cement applied to the face and lugs of said backing plate; a compatible facing having two pairs of parallel slots on the back side thereof, each pair of slots having one slot of uniform width throughout its depth and the other adjacent slot thereof being dovetailed and complementary to the locking lugs of said backing plate, said facing being retained upon said backing plate by said cement and the seated engagement of said dovetailed lugs within said dovetailed and complementary slots; metal contouring on the reverse side of the backing plate from said facing formed to harmonious configuration with the adjacent aspect of the dental arch; and a marginal protecting metal tip projecting beyond the marginal edge of the facing and integral with said metal configuration on the inside surface of the tooth.

4. In an artifical tooth of the character described in claim 3: said backing plate having two parallel dovetailed locking lugs positioned in spaced relation thereon, said locking lugs being horizontally disposed with relation to each other, and said backing plate shaped to have an angular extension at the top edge thereof and to have the configuration of a molar tooth.

5. In an artificial tooth of the character described in claim 3: said backing plate having two parallel dovetailed locking lugs positioned in spaced relation thereon, said locking lugs being vertically disposed with relation to each other, and said backing plate shaped to have an angular extension at the top edge thereof and to have the configuration of an incisal tooth.

6. In an artificial tooth: a facing shaped to the configuration of an incisor, having in the back side thereof two pairs of parallel slots disposed in vertical spaced relation to each other; and each pair of said slots consisting of a uniformly wide slot throughout its depth and a dovetailed slot vertically adjacent thereto.

7. In an artificial tooth: a facing shaped to the configuration of a molar, having in the back side thereof two pairs of parallel slots disposed in horizontal spaced relation to each other; and each pair of said slots consisting of a uniformly wide slot throughout its depth and a dovetailed slot vertically adjacent thereto.

8. In a method of making artificial teeth: using a base mold component having two parallel tongues of uniform width and length projecting therefrom in spaced relation slidably engaged in complementary parallel slots positioned in a central mold component, said central mold component having two parallel dovetailed tongues positioned adjacent to said parallel slots and said parallel tongues of the base component when the central component and base component are slidably engaged; placing facing material in a matrix mold component containing a recess therein for receiving said facing material; positioning said matrix component and facing material therein upon the central mold component and the projecting tongues of said central mold component and said base mold component; curing the material in the assembled mold components; withdrawing the base component and tongues from the central mold component and the matrix component and facing therein; removing the matrix component from the central component and the cured facing; shifting the facing until the dovetailed tongues of the central mold component rest in the slots formed by the tongues of the base mold component and removing the central mold component from the facing by withdrawing the dovetailed tongues of the said component through the slots in the facing formed by the tongues of the base component, thereby forming a facing with two pairs of parallel slots in the back surface thereof, one slot of each pair being dovetailed and the other slot of each pair being of uniform width; shaping a backing plate to correspond with the shape of the facing, said backing plate having two dovetailed lugs in parallel spaced relation with each other adapted to slide into the uniform width slots of the facing and to slip into seated engagement with the dovetailed slots in said facing; placing cement in the slots in the back surfaces of the facing and on the back surface thereof; then placing the facing in position to engage the lugs of the backing plate; positioning and slipping said backing plate into seated engagement with the dovetailed slots in said facing; securing metal on the side of said backing plate opposite said facing and so forming said metal as to provide a compatible configuration thereof with the dental arch to which it will be adjacent and as to provide a protecting metal tip at the biting edge of said facing and of said backing plate.

9. In a method of making a facing for artificial teeth: using a base mold component having two parallel tongues of uniform width throughout their length projecting therefrom in spaced relation slidably engaged in complementary parallel slots positioned in a central mold component, said central mold component having two parallel dovetailed tongues positioned adjacent to said parallel slots and said parallel tongues of the base component when the central component and base component are slidably engaged; positioning facing material in a matrix mold component, containing a recess therein for receiving said facing material; positioning said matrix component and facing material therein upon the central mold component and the projecting tongues of said central mold component and said base mold component; curing the material in the assembled mold components; withdrawing the base component and tongues from the central mold component and the matrix component and facing therein; removing the matrix component from the central component and the cured facing; and shifting the facing in a paralleling direction to the surface of the central mold component until the dovetailed tongues of the central mold component rest in the slots formed by the tongues of the base mold component and removing the central mold component from the facing by withdrawing the dovetailed tongues of said component through the slots in the facing formed by the tongues of the base component, thereby forming a facing with two pairs of parallel slots in the back surface thereof, one slot of each pair being dovetailed and the other slot of each pair being of uniform width.

10. In an artificial tooth: a backing plate having a plurality of parallel dovetailed locking lugs positioned in spaced relation thereon, said locking lugs formed to relatively wide horizontal and thin vertical dimensions, and said backing plate shaped to have an angular extension at the top edge thereof.

11. In an artificial tooth: a facing having in the back side thereof a plurality of pairs of parallel slots, each pair of slots disposed in spaced relation to each of the other pairs of slots, and each pair of slots consisting of a uniformly wide slot throughout its depth and an adjacent dovetailed slot.

12. In an artificial tooth: a backing plate having a plurality of dovetailed locking lugs positioned in spaced relation thereon, said lugs formed to relatively wide horizontal and thin vertical dimensions.

13. In an artificial tooth: a backing plate having a dovetailed locking lug on one side thereof, said lug formed to relatively wide horizontal and thin vertical dimensions.

14. In an artificial tooth: a facing having a pair of parallel adjacent slots in the back side thereof, one slot being of uniform width throughout its length and the other adjacent slot being dovetailed.

15. In an artificial tooth: a backing plate having an angular extension at its top edge and having a dovetailed locking lug on one side thereof, said lug formed to relatively wide horizontal and thin vertical dimensions.

16. In an artificial tooth: a backing plate provided with a plurality of parallel dovetailed locking lugs in spaced relation thereon, said lugs formed to relatively wide horizontal and thin vertical dimensions; a compatible facing having a plurality of pairs of parallel slots in the back side thereof, each pair of slots having one slot of uniform width throughout its depth and the other adjacent slot thereof being dovetailed and complementary to the locking lugs of said backing plate, said dovetailed locking lugs and said dovetailed complementary slots being seatedly engaged; metal contouring on the reverse side of the backing plate from said facing formed to harmonious configuration with the adjacent aspect of the dental arch; and a marginal protecting metal tip projecting beyond the marginal edge of the facing and integral with said metal configuration on the inside surface of the tooth.

17. In an artificial tooth: a backing plate provided with a dovetailed locking lug on one side thereof, said lug formed to relatively wide horizontal and thin vertical dimensions; a compatible facing having a pair of parallel adjacent slots in the back side thereof, one slot being of uniform width throughout its depth and the adjacent slot being dovetailed and complementary to the locking lug of said backing plate, said dovetailed locking lug and said dovetailed complementary slot being seatedly engaged; metal contouring on the reverse side of the backing plate from said facing formed to harmonious configuration with the adjacent aspect of the dental arch; and a marginal protecting metal tip projecting beyond the marginal edge of the facing and integral with said metal configuration on the inside surface of the tooth.

References Cited in the file of this patent
UNITED STATES PATENTS

| 1,499,417 | Steckelmacher | July 1, 1924 |
| 1,517,657 | Sturm | Dec. 2, 1924 |